Dec. 7, 1926.
M. A. BARBER
1,609,279
UNIVERSAL JOINT FOR AUTOMATIC CONNECTERS
Filed Nov. 8, 1923
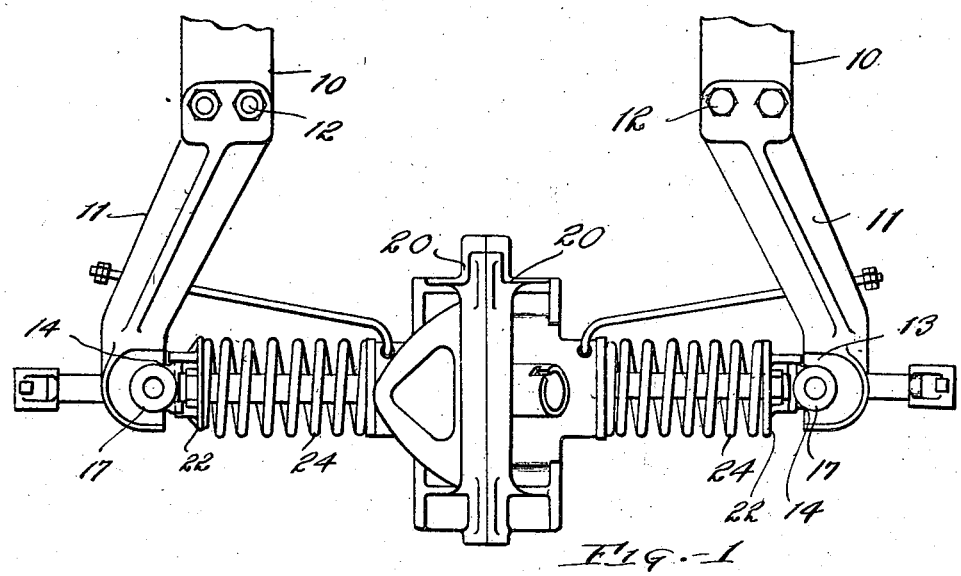
Fig. 1
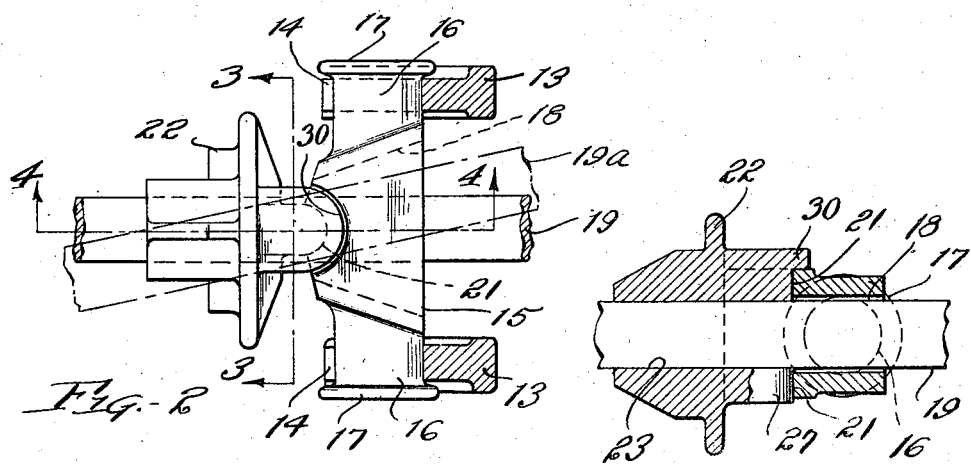
Fig. 2
Fig. 4
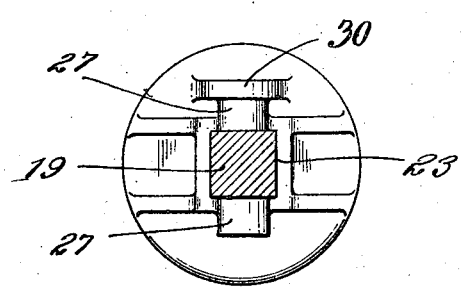
Fig. 3
INVENTOR
Martin A. Barber,
By Dale Macklin,
ATTORNEYS Patented Dec. 7, 1926.

1,609,279

UNITED STATES PATENT OFFICE.

MARTIN A. BARBER, OF CLEVELAND, OHIO.

UNIVERSAL JOINT FOR AUTOMATIC CONNECTERS.

Application filed November 8, 1923. Serial No. 673,414.

This invention relates to automatic train pipe connecters, and particularly to an improved construction and arrangement for supporting the connecter heads so as to permit pivotal movement on bearings in at least two directions.

The principal object of the invention is to improve the construction shown and described in Patent No. 1,347,986, issued to me July 27th, 1920. As disclosed in this patent, the means for pivotally supporting a connector head comprises a pivot block which permits vertical movement of a head with relation to the supporting bracket, together with a spring seat which permits horizontal movement of the head with relation to the bracket. While this structure permits the head to rock easily in any direction, nevertheless, I have found that the swinging movement of the head with relation to the car has a tendency to cause excessive wear of the bearings between the spring seat and the pivot block. Moreover, the weight of the head together with that of the spring interposed between the seat and the head tends to cause uneven wear between the spring seat and the block. This eventually permits the spring seat to drop with relation to the block, thus tending to interfere with the free movement of the shank through the block and seat.

One of the objects of my invention therefore, is the provision of means for preventing unevenness of wear between the spring seat and pivot block, and also to prevent downward movement of the seat with relation to the block.

The features of my invention will be apparent from the description taken in connection with the accompanying drawings wherein Fig. 1 is a side elevation of a pair of coupled connecter heads; Fig. 2 is a horizontal section through the supporting bracket showing a plan view of the pivot block and seat; while Figs. 3 and 4 are sections taken on the correspondingly numbered lines in Fig. 2.

In Fig. 1, I have shown a portion of a draw bar 10 from which depends a supporting bracket 11. The bracket is secured to the underside of the draw bar by any suitable means, such as by bolts 12, and is arranged to extend downwardly and rearwardly. The lower end of the bracket is shown as having spaced arms 13 formed with aligned slots 14 which open at the front side of said arms. A pivot block 15 has trunnions 16 fitted in said slots so that the block is supported for rocking movement about a horizontal axis. The ends of the trunnions 16 are provided with flanges 17 which bear against the outside surfaces of the arms 13, thereby preventing movement of the block transversely of the arms. The block is also formed with an aperture 18, which is rectangular in cross-section and is adapted to receive the rectangular shank 19 of the coupler head 20. The front face of the pivot block above and below the aperture 18 is formed with substantially cylindrical bearing surfaces 21.

A spring seat 22 is arranged in front of the pivot block and is formed with a rectangular aperture 23 for receiving the shank 19. A spring 24 is interposed between the seat 22 and the head 20 and acts to force the head away from the supporting bracket. The rearward face of the seat is provided with two lugs 27 which have substantially semi-cylindrical surfaces adapted to be seated in the bearing surfaces 21 of the pivot block. It will be observed that the engagement of the lugs 27 with the pivot block provides a pivotal connection between these parts which permits rocking movement about an axis perpendicular to the axis of the pivot block. A positioning of the shank when moved with relation to the block is shown by the broken lines 19ª in Fig. 2.

In service, when the cars are rounding a curve, which causes the draw bar of one car to turn with relation to the draw bar of the coupled car, then the pivotal movement between the coupled heads and the associated supporting brackets may take place about the axis of the bearings between each spring seat and the companion pivot block, so that the contacting faces of the coupler heads may remain in engagement. This constant movement of the heads with relation to the brackets causes considerable wear between the lugs 27 and the bearing surfaces 21 in the pivot block. Moreover, the weight of the coupled heads tends to force the spring seats downwardly with relation to the blocks thus causing uneven wear which eventually tends to throw the aperture in each spring seat out of alignment with the aperture 18 in the corresponding pivot block. Each spring seat will tend to bind within the associated block, and to interfere with the normal movement of the shank through the seat and blocks.

If the flange 30 embodying this invention is not employed, then the constant longitudinal movement of the shank 19 wears the bottom face of the trunnion 17 and the upper bearing face of the spring seat 22. Eventually the wear becomes sufficiently great that the upper edge which is now supplied with the flange works into the trunnion opening and thus wedges the shank between the spring seat and the trunnion. This locks the head and prevents movement thereof with reference to the bracket and thereby prevents proper functioning of the connecter heads. In addition, such shifting movement of the shank causes undue wear thereon which eventually causes the formation of a shoulder in the shank and prevents the free movement of the head with reference to the bracket.

To prevent the seat from moving downwardly with relation to the block, and thereby to effect evenness of wear on the lugs 27, I provide a shoulder 30 which is adapted to overhang the upper lug 27 and to engage the top of the block adjacent the upper bearing surface 21. In the preferred form this shoulder comprises a flange which extends around the upper lug thereby tending to maintain the seat in proper position independently of the horizontal position of the head with relation to the bracket.

Having thus described my invention, I claim:

1. In an automatic train pipe connecter, the combination with a relatively stationary supporting bracket, of a connecter head, a universal joint providing a connection between the head and bracket, said joint including two relatively movable members, the head having a rearwardly extending shank passing through said members and one of said members having a laterally extending portion which engages the other member and functions to prevent a downward vertical movement of one member with relation to the other member.

2. In an automatic train pipe connecter, the combination with a relatively stationary supporting bracket, of a connecter head, a universal joint providing a connection between the head and bracket, said joint including two relatively movable members, the head having a rearwardly extending shank passing through the members and means and connected with one of the members and acting upon the other independently of the shank for preventing vertical downward movement of one member with relation to the other member.

In testimony whereof, I hereunto affix my signature.

MARTIN A. BARBER.